(12) United States Patent
Damme

(10) Patent No.: US 7,851,566 B2
(45) Date of Patent: Dec. 14, 2010

(54) INTERCONNECTED LOOP REACTORS

(75) Inventor: Eric Damme, Arquennes (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 616 days.

(21) Appl. No.: 11/501,182

(22) PCT Filed: Feb. 8, 2005

(86) PCT No.: PCT/EP2005/050524

§ 371 (c)(1),
(2), (4) Date: Feb. 7, 2008

(87) PCT Pub. No.: WO2005/080442

PCT Pub. Date: Sep. 1, 2005

(65) Prior Publication Data
US 2008/0242808 A1 Oct. 2, 2008

(30) Foreign Application Priority Data
Feb. 13, 2004 (EP) .................................. 04100588

(51) Int. Cl.
C08F 2/00 (2006.01)
C08F 4/00 (2006.01)
C08F 210/00 (2006.01)
B01J 19/18 (2006.01)

(52) U.S. Cl. ........................... 526/64; 526/90; 526/348; 422/132

(58) Field of Classification Search .................. 526/64, 526/90, 348; 422/132
See application file for complete search history.

(56) References Cited

U.S. PATENT DOCUMENTS

2003/0114608 A1* 6/2003 Tharappel et al. ............. 526/64

* cited by examiner

Primary Examiner—William K Cheung
(74) Attorney, Agent, or Firm—Tenley R. Krueger

(57) ABSTRACT

The present invention describes a reactor comprising two interconnected loops wherein the growing polymer flows continuously in circuit from the first loop to the second loop through a First pipe and back to the first loop through a second pipe. It also discloses process for polymerising olefins in two interconnected loop reactors.

20 Claims, 4 Drawing Sheets

INTERCONNECTED LOOP REACTORS

The present invention relates to the field of ethylene polymerization in a double loop reactor.

Polyolefins such as polyethylenes which have high molecular weight generally have Improved mechanical properties over their lower molecular weight counterparts. However, high molecular weight polyolefins can be difficult to process and can be costly to produce. Polyolefins having a broad or bimodal molecular weight distribution (MWD) are desirable because they can combine the advantageous mechanical properties of high molecular weight fraction with the improved processing properties of the low molecular weight fraction.

For many high density polyethylene (HDPE) applications, polyethylene with enhanced toughness, strength and environmental stress cracking resistance (ESCR) is important. These enhanced properties are more readily attainable with high molecular weight polyethylene. However, as the molecular weight of the polymer increases, the processability of the resin decreases. By providing a polymer with a broad or bimodal MWD, the desired properties that are characteristic of high molecular weight resin are retained while processability, particularly extrusion capability, is improved.

There are several methods for preparing resins with bimodal or broad molecular weight distribution: melt blending, reactor in series configuration, or single reactor with dual site catalyst systems.

Chromium catalysts for use in polyolefin production tend to broaden the molecular weight distribution and can in some cases produce bimodal molecular weight distribution but usually the low molecular part of these resins contains a substantial amount of the comonomer. Whilst a broadened molecular weight distribution provides acceptable processing properties, a bimodal molecular weight distribution can provide excellent properties. In some cases It is even possible to regulate the amount of high and low molecular weight fraction and thereby regulate the mechanical properties.

Ziegler Natta catalysts are known to be capable of producing bimodal polyethylene using two reactors in series. Typically, in a first reactor, a low molecular weight homopolymer is formed by reaction between hydrogen and ethylene in the presence of the Ziegler Natta catalyst. It is essential that excess hydrogen be used in this process and, as a result, it is necessary to remove all the hydrogen from the first reactor before the products are passed to the second reactor. In the second reactor, a copolymer of ethylene and hexene is made so as to produce a high molecular weight polyethylene. The reverse configuration is also known in the art.

Metallocene catalysts are also known in the production of polyolefins. For example, EP-A-0619325 describes a process for preparing polyolefins such as polyethylenes having a multimodal or at least bimodal molecular weight distribution. In this process, a catalyst system that includes at least two metallocene components is employed. The metallocene components can be selected, for example, from a bis(cyclopentadienyl) zirconium dichloride and an ethylene-bis(indenyl) zirconium dichloride. By using the two different metallocene catalyst components in the same reactor, a molecular weight distribution is obtained which is at least bimodal.

Certain applications such as pipes require a polyethylene resin with high resistance against slow crack growth as well as resistance to rapid crack propagation yielding impact toughness. EP-A-0571987 discloses for example a process for producing an ethylenic polymer composition using multistage polymerisation. The catalyst comprises, as principal components, a transition metal compound, a compound capable of reacting with the transition metal compound to form an ionic complex and an organoaluminum compound.

Alternatively, a broad or multimodal molecular weight distribution can be obtained by physical blending of two or more resins such as described for example in EP-A-0735090 that discloses a polyethylene resin composition which is produced by physical blending of three polyethylene components.

In yet another method, the gas-phase catalytic polymerisation of alpha-olefins is carried out with a Ziegler-Natta catalyst system In two or more interconnected polymerisation zones and characterised in that the gas introduced in the second polymerisation zone is of a different composition from that of the gas present in the first polymerisation zone: this is the multizone circulating reactor technology. It consists of two interconnected polymerization zones:
1. a "riser" or fast-fluidisaton zone wherein the gas velocity is larger than the transport velocity;
2. a "downcomer" wherein the polymer particles flow downard under the force of gravity.

The monomer is fed in the 'riser' with the catalyst system, under polymerisation conditions. The growing polymer flows upward, under fast fluidisation conditions, and then leaves the "riser" and enters the "downcomer" wherein the polymer particles flow downward under the action of gravity. The particles then leave the "downcomer" and are reintroduced into the "riser". A circulation is thus established between the two polymerisation zones.

The method further requires that
1. the gas mixture present in the "riser" be fully or partially prevented from entering the downcomer";
2. the gas and/or liquid mixture Introduced in the "downcomer" be different from the gas mixture present in the "riser".

The multizone circulating reactor technology has been described for example in WO-A-97/04015 and WO-A-00/02929. It has been used primarily with Ziegler-Natta catalyst systems and suffers from the disadvantage that it is difficult to remove completely the gas mixture present in the "riser" and to prevent it from entering the "downcomer". And it is difficult to control the gaz composition in the two zones There is thus a need for a polymerisation system that does not suffer from this drawback.

It is an aim of the present invention to provide a polymerisation technology that produces very homogeneous polymers.

It is also an aim of the present invention to provide a polymerisation technology that produces polymers having a broad or multimodal molecular weight distribution.

Accordingly the present invention discloses a double loop reactor for polymerising olefins comprising:
  a) two loop reactors (1) and (11);
  b) connecting means (4) to transfer the growing polymer from the first loop reactor to the second loop reactor;
  c) connecting means (14) to transfer the growing polymer from the second loop reactor back to the first loop reactor.

It also discloses a polymerisation technology that consists of two interconnected loops wherein the growing polymer flows continuously in circuit from the first loop to the second loop and back to the first loop.

Preferably, the polymer flows on average no more than three times around the two loops, more preferably, no more than twice.

Under the normal operating conditions of a double loop reactor, the monomer, diluent, hydrogen and comonomer are injected downstream the pump in the first loop and the growing polymer circulates around the loop with a velocity of about 8 m/sec, which correspond to one rotation every 30 seconds for a 100 m3 reactor. The monomer is dissolved in the diluent and the particulate polymer is suspended in the liquid. After 40 minutes to one hour of average residence time in the first loop, corresponding to about 100 rotations around the loop, the particulate polymer is transferred to the second loop.

The transfer is often difficult as it is desirable to control the polymerisation mixture in each loop independently and therefore to remove from the stream exiting the first reactor any component that is undesirable in the second loop. Several methods have been disclosed in literature to operate that transfer. For example, US-2001/0018499 describes a process in which most of the hydrogen present in the first reactor is removed by relieving the pressure of the suspension before sending it to the second reactor. U.S. Pat. No. 5,639,834 describes a process wherein the comonomer-rich suspension formed in the first reactor is drawn off from this reactor by means of settling legs, and wherein the concentrated suspension is sent to the second reactor in which the amount of comonomer is reduced. U.S. Pat. No. 4,692,501 describes a process in which the suspension formed in the first reactor is washed by a liquid counter-current in an exchange zone before being sent to the second reactor. US-A-2001/0018500 describes a continuous polymerisation process wherein a suspension of polyethylene particles, withdrawn from the first reactor, is sent to a hydrocyclone separator where it is separated into a concentrated suspension that is sent to the second reactor and into a stream comprising the diluent that is partially recycled to the first polymerisation zone.

The operating conditions in the second reactor are generally different from those in the first reactor as it is desired to produce a polyolefin having a broad molecular weight distribution. The residence time in the second reactor is shorter than in the first reactor, typically 50% shorter, and the pressure is typically one bar lower than in the first reactor in order to facilitate the transfer.

The double loop reactor can be operated either in direct mode where the high molecular weight fraction of the polymer is produced in the first reactor and the low molecular weight fraction is produced in the second reactor, or in reverse mode.

The final polymer is preferably removed by means of settling legs where the solids content is allowed to increase.

These conditions of operations are known in the art. The present invention further discloses a transfer of the growing polymer from the second loop, back to the first loop and thus a continuous transfer of growing polymer from one loop to the other.

In a preferred embodiment according to the present invention, the transfer from the first loop to the second loop, and back to the first loop is carried out by means of settling legs.

FIG. 1 represents an interconnected loop reactor according to the present invention. The monomer, optional comonomer, hydrogen and diluent are fed into the first loop (1) downstream the pump (2). The growing polymer is transferred to the second loop by means of the settling legs (3) through line (4), and it is fed into the second loop (11) just upstream the pump (12). The portion of the growing polymer that is recycled back to the first loop is collected just downstream the pump of the second reactor, in the settling legs and then fed into the first reactor just upstream the pump through line (14). This set up has a positive pressure difference between the point of exit from the second reactor and the point of entry into the first reactor, thereby allowing easy transfer from the second loop to the first loop. The final polymer is retrieved from the second loop by means of the settling legs (13) through line (15).

In another embodiment according to the present invention, represented in FIG. 2, the material exiting the first loop is sent through transfer line 24 to a hydrocyclone separator (25). All or a portion of the suspension of polymer particles is sent to the second loop through transfer line 26, the remainder, if any, being either sent back to the first loop through transfer line 27 or retrieved. After residence in the second loop, the polymer particles are concentrated in settling legs 13 and sent back to the first loop through transfer line 28 or retrieved through line 29.

The geometry and the operating conditions of this new polymerisation technique are selected to allow an easy transfer from one loop to the other. More particularly, the pressure in each reactor must be selected so that the pressure in the receiving section is always inferior to that of the sending section. This is achieved by the configuration disclosed in FIG. 1 where it is made use of the fact that the pressure just downstream the pump is about 1 bar higher than that just upstream the pump.

Alternatively a centrifugal pump may be used to push the polymer particles through the transfer pipes and be liberated of the pressure difference constraint.

In another embodiment, the polymer slurry coming out of the second reactor is degassed at low pressure in a stirred vessel in order to remove all traces of hydrogen and is injected in the first reactor with the help of multistage centrifugal pumps (FIG. 3).

In a further embodiment according to the present invention, the slurry coming out the reactor is sent to a flash tank and is completely degassed. The gas is sent to the recycle section. A fraction of the polymer is sent to the extruder and a fraction of the polymer is wetted with isobutane and pumped back in the first reactor (FIG. 4).

The catalyst systems that can be used with the present polymerisation I are not particularly limited, but it is preferred to select catalyst systems that have a good response to both hydrogen and comonomer as it is desired that the two polymerisation zones operate independently from one another. The preferred catalyst systems comprise a metallocene component, more preferably, a bis-indenyl component of the general formula

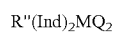

wherein R" is a structural bridge, Ind is an indenyl or a tetrahydroindenyl group, substituted or unsubstituted, M is a metal group IV of the Periodic Table and Q is a hydrocarbyl having from 1 to 20 carbon atoms or a halogen, or a cyclopentadienyl-fluorenyl component of the general formula

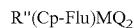

wherein Cp is a cyclopentadienyl, substituted or unsubstituted and Flu is a fluorenyl, substituted or unsubstituted.

The catalyst system used in the present invention comprises, in addition to the above catalyst component, one or more activating agents having an ionising action and capable of activating the metallocene catalyst component. Typically, the activating agent comprises an aluminium or a boron-containing compound, well known in the art.

This method is particularly advantageous when metallocene catalyst systems are used as they are difficult to mix: the continuous transfer of material from one loop to the other increases the homogeneity of the polymer. The homogeneity is increased at the level of polymeric composition, and within each grain at the level of the percentage of high and low molecular weight in the polymer. In addition, as metallocenes consume hydrogen, there will be no need to remove remaining hydrogen from the polymer exiting the first loop prior to transfer to the second loop. The metallocene catalyst systems also have an excellent response to both hydrogen and comonomer.

The preferred polymer is polyethylene.

LIST OF FIGURES

Figure 3:
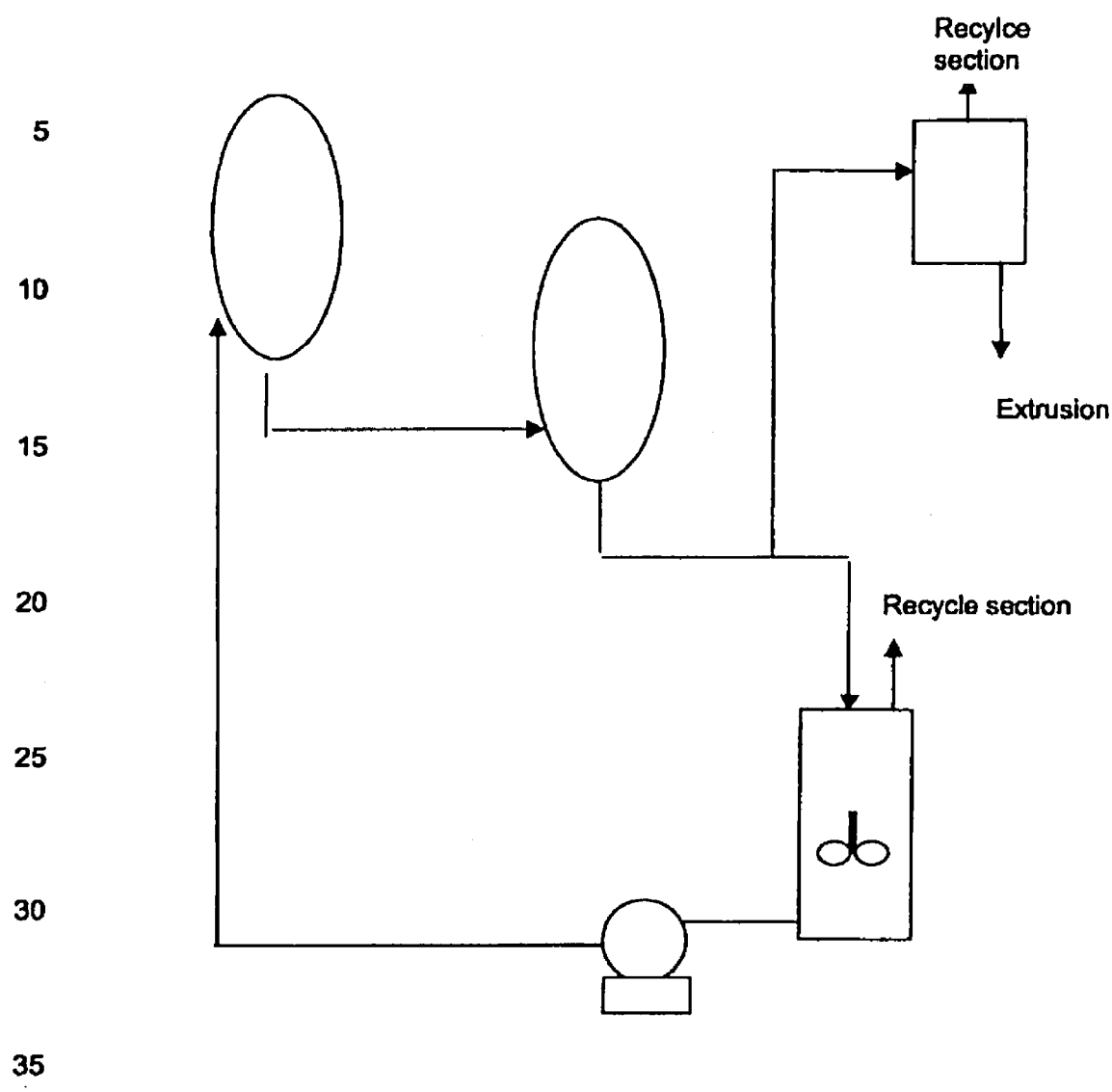

FIG. 3 represents an embodiment according to the present invention wherein the polymer is transferred from the second loop reactor to the first loop reactor by means of a Moineau-type pump. The polymer slurry coming out of the second reactor is degassed at low pressure in a stirred vessel in order to remove all traces of hydrogen and is injected in the first reactor with the help of multistage centrifugal pumps.

Figure 4:
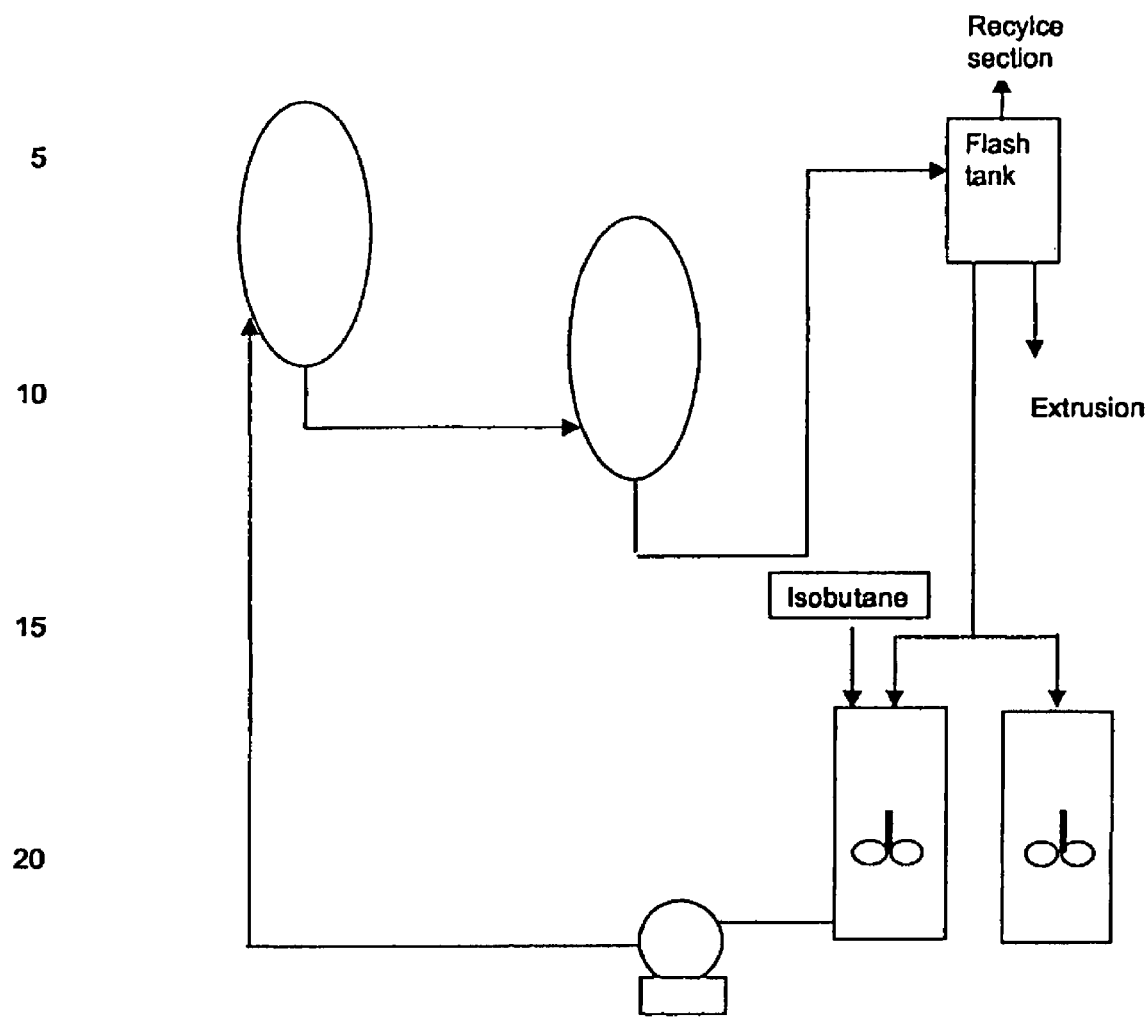

FIG. 4 represents a further embodiment according to the present invention wherein the polymer is transferred from the second loop reactor to the first loop reactor by means of a Moineau-type pump. The slurry coming out the reactor is sent to a flash tank and is completely degassed. A fraction of the polymer is sent to the extruder and the other fraction of the polymer is wetted with isobutane and pumped back in the first reactor.

EXAMPLE

Figure 1:
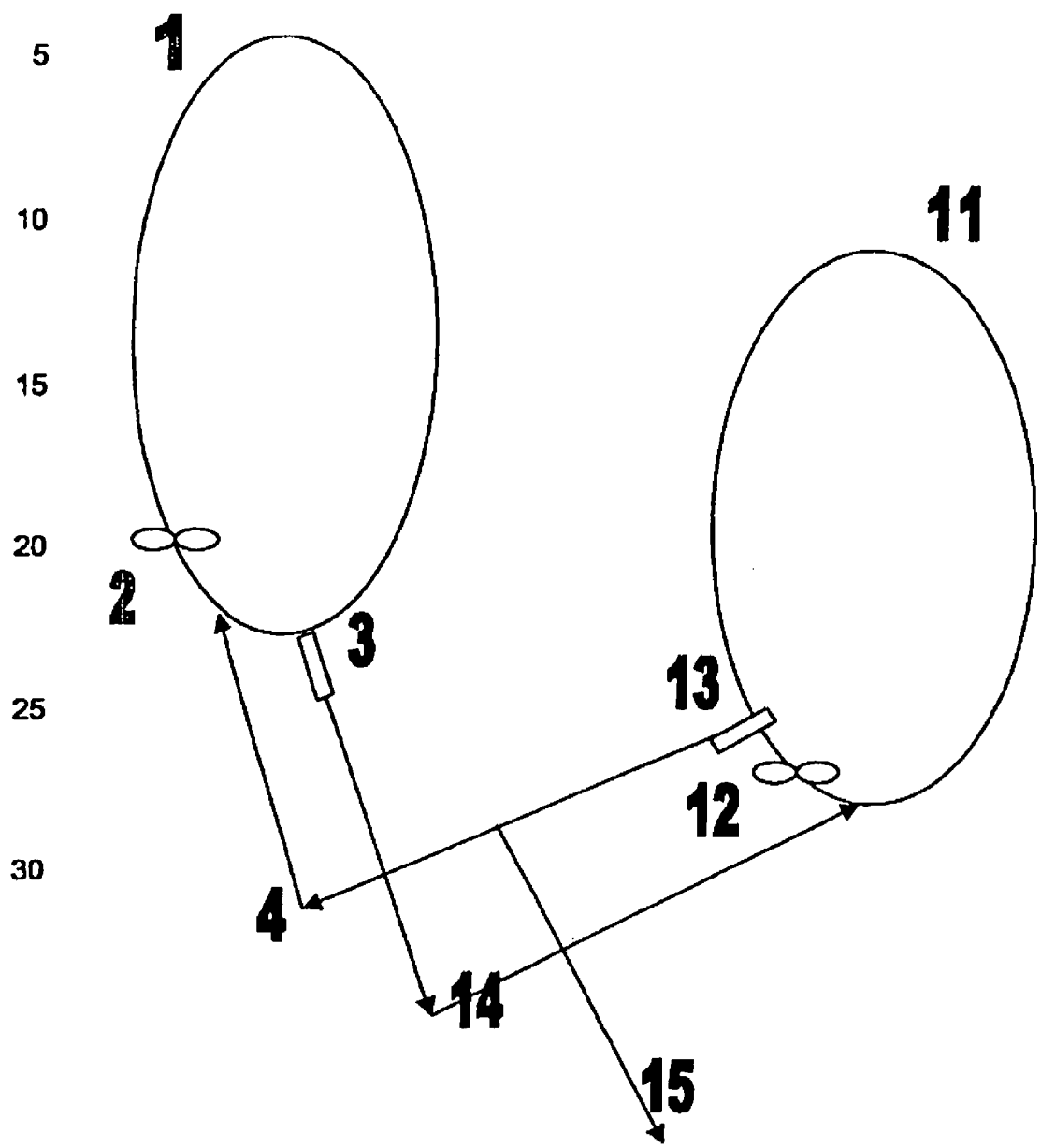
FIG. 1 represents an embodiment according to the present invention wherein the polymer is transferred from one loop reactor to the other loop reactor by means of a pressure difference.
Figure 2:
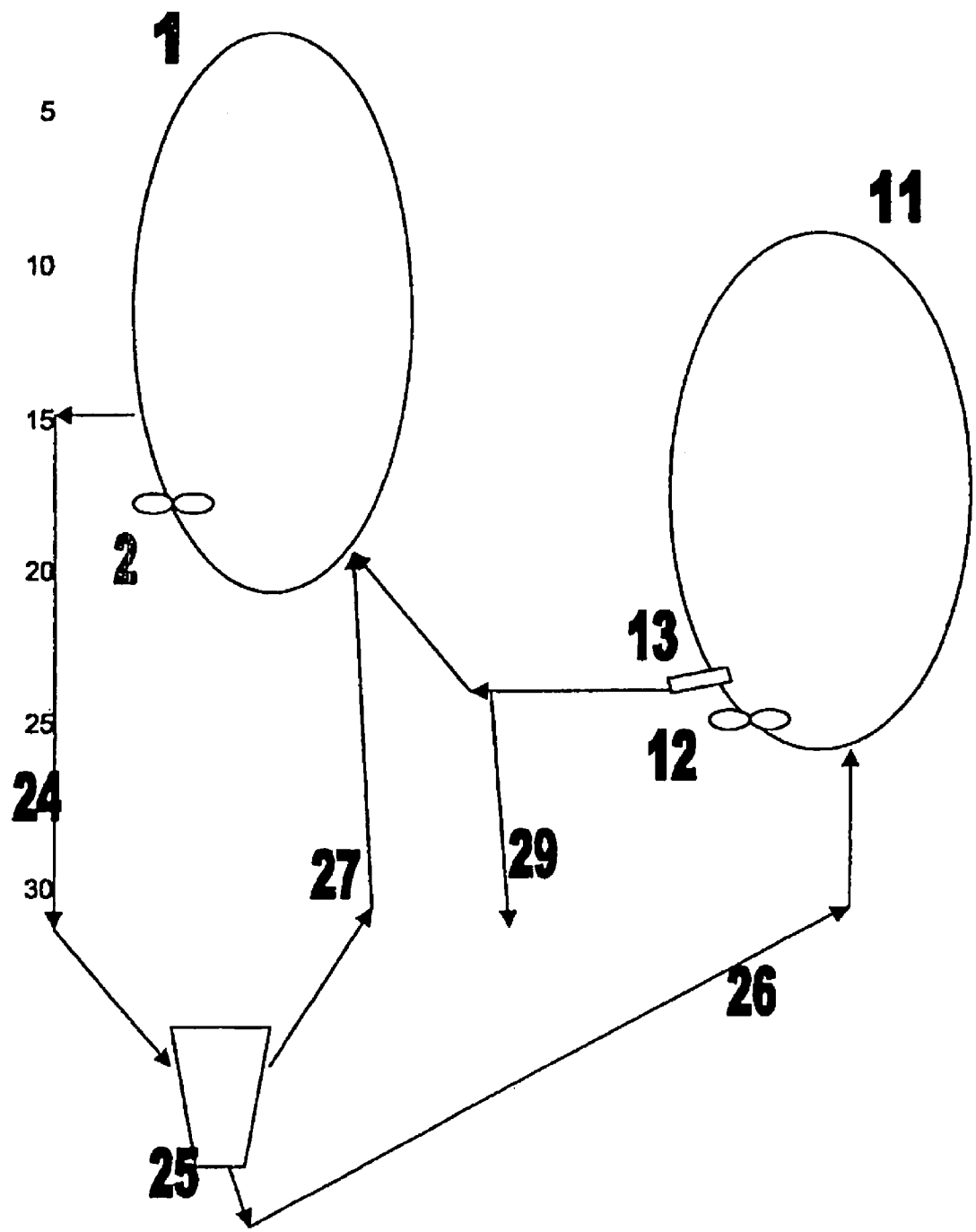
FIG. 2 represents an embodiment according to the present invention wherein the polymer is transferred from one loop reactor to the other loop reactor by means of an hydrocyclone.

In a specific working example according to the present invention, and following the configuration displayed in FIG. 1, the pressure just downstream the pump (2) in the first loop is of about 41 bars. The polymer is retrieved from the first loop about halfway in the first loop where the pressure is of about 40.5 bars. The second loop is always kept at an overall pressure that is slightly less than the pressure in the first loop, here a pressure of about 40.5 bars just downstream the pump (12). The polymer extracted from the first loop is Injected in the second loop just upstream the pump (12) where the pressure is of about 39.5 bars. The polymer is extracted from the second loop just downstream the pump (12) where the pressure is of about 40.5 bars and it is injected in the first loop just upstream the pump (2) where the pressure is of about 40 bars. This configuration allows an easy flow of the polymer between the two reactors, but any other means of circulating the polymer between the two loops could also be used.

The polymers produced according to the present invention are very homogeneous as they are progressively developed in each reactor, going from one to the other, whereas the polymers produced in the previous double loop system were the result of a superposition of the conditions in the first reactor and then in the second reactor.

The invention claimed is:

1. A double loop reactor system suitable for the polymerization of an olefin comprising:
   a) a first loop reactor having an inlet for the introduction of an olefin monomer and a diluent carrier liquid into said first loop reactor;
   b) a pump in said first loop reactor for circulating diluent liquid and olefin monomer through said first loop reactor to provide for the polymerization of said monomer to produce a slurry of polymer particles in said diluent liquid;
   c) a second loop reactor having an inlet for the introduction of an ethylene monomer and a diluent carrier liquid into said second loop reactor;
   d) a pump in said second loop reactor for circulating diluent liquid and olefin monomer through said second loop reactor to provide for the polymerization of said monomer to produce a slurry of polymer particles in said diluent liquid;
   e) a transfer line extending from an outlet in said first loop reactor to said second loop reactor to transfer polymer slurry from said first loop reactor to said second loop reactor; and
   f) a recycle line extending from an outlet in said second loop reactor to a recycle inlet in said first loop reactor to recycle polymer slurry from said second loop reactor back to said first loop reactor.

2. The system of claim 1 wherein said recycle line is connected to said first loop reactor at a location upstream of the pump in said first loop reactor.

3. The system of claim 2 wherein said transfer line is connected to said second loop reactor at a location upstream of the circulating pump in said second loop reactor.

4. The system of claim 1 further comprising a withdrawal line connected to said recycle line between said second reactor outlet and said recycle inlet to provide for withdrawal of a portion of the polymer slurry in said recycle line to remove slurry from said reactor system.

5. The system of claim 1 further comprising a hydrocyclone associated with said first loop reactor and connected in said transfer line extending from said first loop reactor to said second loop reactor.

6. The system of claim 5 wherein said hydrocyclone has a first outlet connected in said transfer line for the transfer of slurry to said second loop reactor and a second outlet from said hydrocyclone connected to a first reactor transfer line leading back to said first reactor.

7. The system of claim 6 further comprising a withdrawal line connected to said recycle line between said second reactor outlet and said recycle inlet to provide for withdrawal of a portion of the polymer slurry in said recycle line to remove slurry from said reactor system.

8. The system of claim 1 further comprising a recirculating pump in said recycle line for recycling polymer slurry back to said first loop reactor.

9. The system of claim 8 further comprising a degassing vessel in said recycle line upstream of said recycle pump for releasing gas from the recycled slurry from the second loop reactor.

10. The system of claim 9 further comprising a withdrawal line connected to said recycle line between said outlet and said recycle inlet to provide for withdrawal of a portion of the polymer slurry in said recycle line to remove slurry from said reactor system.

11. The system of claim 1 wherein the outlet in said first loop reactor comprises a settling leg connected to said first loop reactor.

12. The system of claim 11 wherein the outlet in said second loop reactor comprises a settling leg connected to said second loop reactor.

13. A method for the polymerization of an olefin in a double loop reactor system comprising first and second interconnected loop reactors comprising:

a) introducing an olefin monomer, a polymerization catalyst system and a diluent carrier liquid into a first loop reactor of said reactor system;

b) circulating said diluent liquid and olefin monomer through said first loop reactor while polymerizing said olefin monomer in the presence of said catalyst system to produce a slurry of polymer particles in said diluent carrier liquid;

c) withdrawing said slurry from said first loop reactor and supplying at least a portion of said withdrawn slurry to said second loop reactor through a transfer line extending from said first reactor to said second reactor;

d) introducing an olefin monomer and a diluent carrier liquid into said second loop reactor;

e) circulating said diluent liquid and olefin monomer through said second loop reactor while polymerizing said olefin monomer in the presence of said catalyst system to produce a slurry of polymer particles in said diluent in said second reactor; and f) withdrawing said polymer slurry from said second loop reactor and recycling at least a portion of said withdrawn slurry through a recycle line to a recycle inlet of said first loop reactor to recycle said polymer slurry from said second loop reactor back to said first loop reactor.

14. The method of claim 13 wherein the circulation of said diluent and olefin monomer in said first reactor is carried out by the operation of a first reactor circulating pump in said first loop reactor and the circulation of diluent liquid and olefin monomer in said second loop reactor is carried out by the operation of a second reactor circulating pump located in said second loop reactor.

15. The method of claim 14 wherein said recycle line is connected to said first loop reactor at a location upstream of the pump in said first loop reactor.

16. The method of claim 15 wherein said transfer line is connected to said second loop reactor at a location upstream of the circulating pump in said second loop reactor.

17. The method of claim 13 further comprising diverting a portion of the slurry in said recycle line to a withdrawal line connected to said recycle line between said second outlet reactor and said recycle inlet to provide to recall said slurry.

18. The method of claim 13 further comprising passing said withdrawn slurry in said transfer line into a hydrocyclone and flowing a portion of said slurry from said hydrocyclone back to said first loop reactor and flowing another portion of said slurry from said hydrocyclone back to said transfer line to said second loop reactor.

19. The method of claim 14 wherein said polymerization catalyst system incorporates a metallocene catalyst component.

20. The method of claim 19 wherein said metallocene catalyst component is a bridged bis-indenyl compound characterized by the formula:

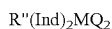

$$R''(Ind)_2MQ_2$$

wherein:

a) R" is a structural bridge extending between said indenyl groups;

b) Ind is an indenyl group or a tetrahydroindenyl group which may be substituted or unsubstituted;

c) M is a metal from group IV of the Periodic Table of Elements; and d) Q is a hydrocarbyl group having from 1 to 20 carbon atoms or is a halogen.

* * * * *